United States Patent
Hamilton

(10) Patent No.: US 7,123,974 B1
(45) Date of Patent: Oct. 17, 2006

(54) SYSTEM AND METHODOLOGY PROVIDING AUDIT RECORDING AND TRACKING IN REAL TIME INDUSTRIAL CONTROLLER ENVIRONMENT

(75) Inventor: Jeffrey L. Hamilton, Cedarburg, WI (US)

(73) Assignee: Rockwell Software Inc., West Allis, WI (US)

( * ) Notice: Subject to any disclaimer, the term of this patent is extended or adjusted under 35 U.S.C. 154(b) by 103 days.

(21) Appl. No.: 10/299,496

(22) Filed: Nov. 19, 2002

(51) Int. Cl.
G05B 19/42 (2006.01)

(52) U.S. Cl. .............. 700/87; 700/9; 700/17; 700/83; 700/86; 717/101; 717/102; 717/103; 717/120; 717/121; 717/122; 717/123; 717/168; 717/170; 707/203; 726/2; 726/3; 726/22; 726/23

(58) Field of Classification Search .............. 700/9, 700/17, 83, 86, 87; 717/101, 102, 103, 120, 717/121, 122, 123, 168, 170; 707/203; 713/201; 726/2, 3, 22, 23
See application file for complete search history.

(56) References Cited

U.S. PATENT DOCUMENTS

| | | | |
|---|---|---|---|
| 4,251,858 A | 2/1981 | Cambigue et al. | |
| 4,672,572 A | 6/1987 | Alsberg | |
| 5,574,898 A | 11/1996 | Leblang et al. | |
| 5,748,890 A | 5/1998 | Goldberg et al. | |
| 5,789,770 A | 8/1998 | Rostoker et al. | |
| 5,835,915 A | 11/1998 | Carr et al. | |
| 6,189,016 B1* | 2/2001 | Cabrera et al. | 707/203 |
| 6,237,786 B1* | 5/2001 | Ginter et al. | 213/153 |
| 6,256,773 B1* | 7/2001 | Bowman-Amuah | 717/121 |
| 6,356,941 B1* | 3/2002 | Cohen | 709/219 |
| 6,442,448 B1* | 8/2002 | Finley et al. | 700/231 |
| 6,493,685 B1* | 12/2002 | Ensel et al. | 705/40 |
| 6,615,349 B1* | 9/2003 | Hair | 713/165 |
| 2002/0049512 A1* | 4/2002 | Mizuno et al. | 700/169 |
| 2002/0069370 A1* | 6/2002 | Mack | 713/201 |
| 2002/0083059 A1* | 6/2002 | Hoffman et al. | 707/9 |
| 2002/0116399 A1* | 8/2002 | Camps et al. | 707/200 |
| 2002/0123996 A1* | 9/2002 | O'Brien | 707/6 |

(Continued)

FOREIGN PATENT DOCUMENTS

DE 31 24 809 A 1/1983

(Continued)

OTHER PUBLICATIONS

S. Jonda; European Search Report; EP 03 01 9418; Aug. 13, 2004; Munich, Germany.

*Primary Examiner*—Anthony Knight
*Assistant Examiner*—Douglas Shute
(74) *Attorney, Agent, or Firm*—Amin & Turocy, LLP

(57) ABSTRACT

The present invention relates to a system and methodology facilitating automated audit recording and tracking of PLC-based interactions. A recording component is provided that interacts with an application that can change or alter one or more characteristics of PLC operations. The recording component can be client-based on the same or associated platform as the application or can be embedded within a control system component. When interactions have been recorded, a tracking component aggregates such interactions in a file or record stored in a local or remote database, wherein audit reports that document control interactions or changes can automatically be generated from such files. Recorded interactions can be stored in a substantially real time manner and include records of all interactions with a control system as opposed to merely saving a final program or resultant image of such interactions, thus facilitating a more controlled and secure auditing environment.

39 Claims, 12 Drawing Sheets

U.S. PATENT DOCUMENTS

2003/0005109 A1*  1/2003  Kambhammettu et al. .. 709/224
2003/0014557 A1*  1/2003  Berger et al. ............... 709/318
2003/0023616 A1*  1/2003  Kay et al. ................... 707/200
2003/0138105 A1*  7/2003  Challener et al. ........... 380/277

FOREIGN PATENT DOCUMENTS

EP      0 539 726 A      5/1993
EP      1 117 204 A      7/2001

* cited by examiner

SYSTEM AND METHODOLOGY PROVIDING AUDIT RECORDING AND TRACKING IN REAL TIME INDUSTRIAL CONTROLLER ENVIRONMENT

TECHNICAL FIELD

The present invention relates generally to industrial control systems, and more particularly to a system and methodology to facilitate recording and tracking of electronic interactions with an industrial controller system in a real time manner.

BACKGROUND OF THE INVENTION

Industrial controllers are special-purpose computers utilized for controlling industrial processes, manufacturing equipment, and other factory automation, such as data collection or networked systems. In accordance with a control program, the industrial controller, having an associated processor (or processors), measures one or more process variables or inputs reflecting the status of a controlled system, and changes outputs effecting control of such system. The inputs and outputs may be binary, (e.g., on or off), as well as analog inputs and outputs assuming a continuous range of values.

Measured inputs received from such systems and the outputs transmitted by the systems generally pass through one or more input/output (I/O) modules. These I/O modules serve as an electrical interface to the controller and may be located proximate or remote from the controller including remote network interfaces to associated systems. Inputs and outputs may be recorded in an I/O table in processor memory, wherein input values may be asynchronously read from one or more input modules and output values written to the I/O table for subsequent communication to the control system by specialized communications circuitry (e.g., back plane interface, communications module). Output modules may interface directly with one or more control elements, by receiving an output from the I/O table to control a device such as a motor, valve, solenoid, amplifier, and the like.

At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

Many industries such as chemical, pharmaceutical and other process applications employ PLC's and associated modules to automatically manufacture a plurality of various products. However, these type industries are often highly regulated and generally require extensive documentation of the overall manufacturing process in order to provide controls on the quality of products that are produced (e.g., controls regulating manufacturing processes in order to facilitate public safety). One such regulation relates to FDA regulation "21 CFR Part 11" that outlines an electronic validation procedure when documenting corresponding changes to such processes. For example, this includes how records are kept, who can access such records, and what procedures/controls are designed to ensure the authenticity, integrity, and, when appropriate, the confidentiality of electronic records.

Some attempts have been made at achieving compliance with the above noted regulation, whereby records of program changes may be generated after an editing procedure has already occurred to a program and often at a time that is far removed from the actual time of change. One example is that in some applications, a program change is recorded as part of a check-in procedure to a database which may occur well after the change has been made and may only reflect the final product of such changes. Thus, intermediate changes or other program interactions may go unrecorded. In contrast, given the discrete and real time nature of PLC systems, however, often times changes occur to various aspects of the PLC system that can have an immediate consequence on the system, yet not translate into an actual change to the underlying PLC program. For example, such changes can include real time forcing operations, wherein a bit may be forced to a value other than what the underlying logic has determined. Other changes such as clearing/setting a counter, register, and/or status area of PLC memory can also produce dramatic, process-changing results. In view of time sensitive transactions or changes that can occur in PLC-driven systems and the above regulations, there is a need for automated systems or components that can document changes in a more real time and controlled manner.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to provide electronic audit recording and tracking of interactions with an industrial control system in order to facilitate access to such systems in a controlled manner while automatically generating records that document such access. A real time recording component is provided that interacts with an application such as an editing tool, for example. When the application logs on or communicates to a respective control system component, the recording component records all interactions (or controlled subset of interactions) with the control system during a current session. The respective interactions or changes are provided to a tracking component that stores the interactions in a database record associated with the control system being accessed. Upon demand (or event), the tracking component can generate electronic auditing information for the control system by retrieving the previous recordings that have been collected, aggregated, or stored for such interactions. Thus, the present invention accords an integration of electronic auditing procedures into one or more components that interact with the control system in order to provide concurrent recording and tracking, for example, of actual changes being made to the control and in contrast to merely storing a selected or designated program version as the current version. Accordingly, users cannot elect to separately document a change that may not reflect the actual changes that were made to the control system.

In one aspect of the present invention, the recording component can be provided as part of a client application such as a Human Machine Interface (HMI) tool, wherein interactions affected via the tool are recorded and passed to the tracking component for subsequent database storage. Such transactions can occur in accordance with encrypted or other security measures, wherein actual interactions to the control system can be encrypted and/or the records associated with such interactions can be similarly encrypted for additional security and controls over such records. In addition, such records may be described and stored in a schema that documents various changes that have been made. At various times, the tracking component can be queried to provide an aggregation of all transactions that have occurred. Such aggregation can be provided as an electronic file or report that documents such items as who accessed the control, when did access start and stop, location for such access, and access type, for example.

In another aspect of the present invention, the recording component resides in the control or control component itself. Thus, the recording component can report interactions on an event-driven bases, on a periodic basis, and/or as polled from the control component and then subsequently stored in an electronic record associated with the control component. This type of recording residing on the control can be applied in wireless and/or hand held device applications that may interact with the control yet, not receive consistent interactions with a tracking database for recording such changes. In another aspect, the recording component resident on the control may serve as a back-up or check to a master database that has recorded interactions with the control. If recorded changes registered at the control do not match recorded changes at the master database, further auditing procedures can be initiated (e.g., initiate other auditing processes to determine why control component does not match database records).

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology facilitating automated audit recording and tracking of PLC-based interactions. A recording component is provided that interacts with an application that can change or alter one or more characteristics of PLC operations (e.g., a user interface to modify PLC parameters or programs). The recording component can be client-based on the same or associated platform as the application or can be embedded within a control system component. When interactions have been recorded, a tracking component aggregates such interactions in a file or record stored in a local or remote database, wherein audit reports that document control interactions or changes can automatically be generated from such files. Recorded interactions can be stored in a substantially real time manner and include records of all interactions with a control system as opposed to merely saving a final program or resultant image of such interactions, thus facilitating a more controlled and secure auditing environment.

It noted that as used in this application, terms such as "component," "recording component," "tracking component," and the like are intended to refer to a computer-related entity, either hardware, a combination of hardware and software, software, or software in execution. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers. In another example, a recording component can be a process executable on a computer to process PLC interactions in accordance with an application that interfaces to a PLC that may alter one or more characteristics of PLC operations. Similarly, a tracking component stores recorded PLC interactions within a remote and/or local database and automatically generates audit reports therefrom.

Figure 1:
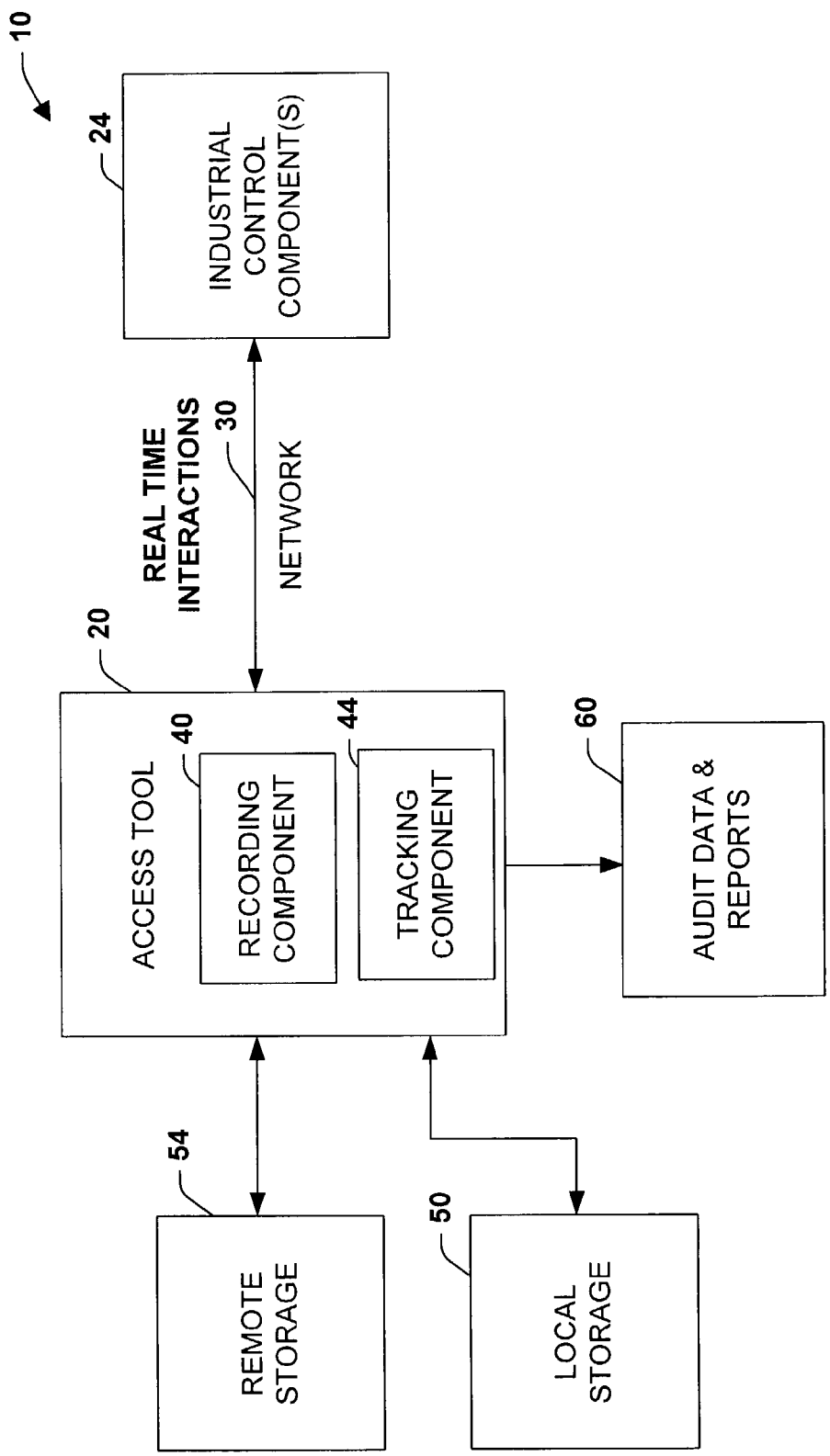
FIG. 1 is a schematic block diagram illustrating an audit recording and tracking system for an industrial control environment in accordance with an aspect of the present invention.

Referring initially to FIG. 1, an audit recording and tracking system 10 for an industrial control environment is illustrated in accordance with an aspect of the present invention. An access tool 20 interacts with one or more industrial control components 24 via a network 30. The access tool 20 can include substantially any type of hardware and/or software (e.g., editing tool, programming tool, communications component, monitoring component) that may interact with the industrial control components 24 which can include programmable logic controllers (PLCs), communications modules and/or I/O modules, whereas the network 30 can include local factory networks (e.g., Ethernet, ControlNet, DeviceNet) and/or public networks such as the Internet, for example.

As interactions are attempted across the network 30, a recording component 40 records or logs activities directed to the industrial control components 24 in a real time manner. For example, the recording component 40 logs interactions or activities that have been directed to the industrial control components 24 during a current application session associated with the access tool 20, wherein some example data that may be logged includes: access dates, access times, applications that have attempted access, user names, online/offline status, when the applications have started and stopped, what other files were invoked, opened, or saved by the application, and/or the type of access being directed to the industrial control components 24 such as forcing or changing memory program elements, logic program changes, status changes such as run/program mode changes, memory alterations and so forth. In general, substantially any remote/local interaction with the industrial control components 24 is logged by the recording component 40 during the current application session of the access tool 20 in a substantially real time manner.

A tracking component 44 is provided to aggregate activities logged by the recording component 40 in a local storage or cache 50 and/or in a remote storage location 54 such as a database server. It is noted that if industrial control component 24 interactions are stored locally, that a subsequent transfer of the local storage can be achieved by transferring files or data from the local storage 50 to the remote storage 54. The tracking component 44 aggregates transaction data by creating a file, schema, and/or data structure (not shown) in the local or remote storage 50 and 54, and tags the file with an identifier relating to the industrial control component 24 that has been accessed. For example, a tag or file name may be created for PLCA, PLCB, Communications module C, I/O module D . . . and so forth.

As respective industrial control components 24 are accessed, the tracking component 44 stores the information collected by the recording component 40 in the file marked for the component so accessed. During an audit procedure (e.g., automated report request generated from a user interface or as scheduled from a maintenance application), the tracking component 44 can automatically access the local and/or remote storage 50 and 54, retrieve one or more tagged files and generate, transmit, display and/or report the files for subsequent auditing and tracking procedures (e.g., generate audit report of system activities during specified period for regulated industry requirements). The files or data can be automatically provided in an audit data and report 60 which contain the activities that have been logged for the industrial control components 24 over time, wherein the audit data and reports are described in more detail below.

Figure 2:
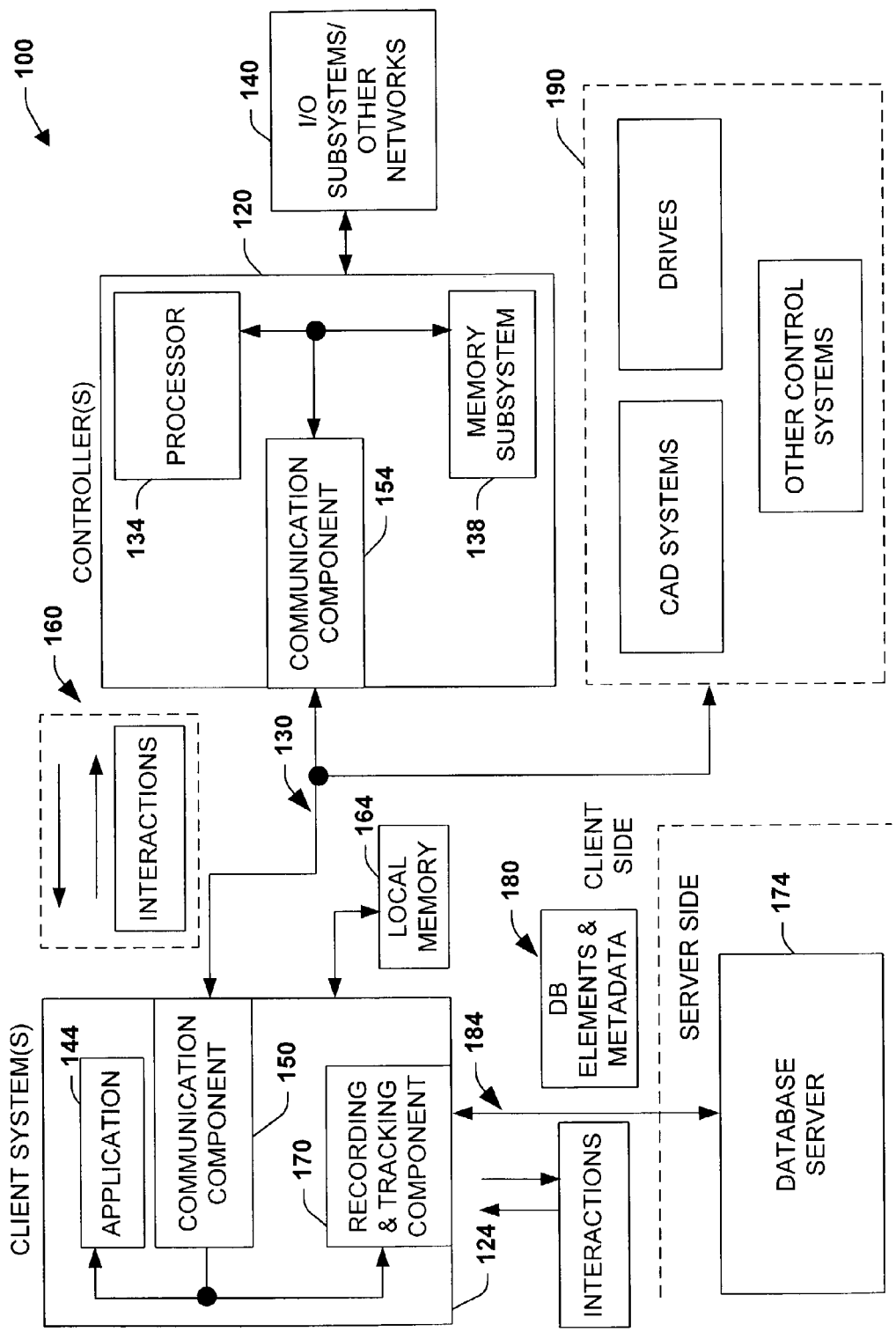
FIG. 2 is a schematic block diagram illustrating an exemplary industrial control and audit/tracking system in accordance with an aspect of the present invention.

Referring now to FIG. 2, an exemplary industrial control and audit/tracking system 100 is illustrated in accordance with an aspect of the present invention. The system 100 includes an industrial controller 120 communicating to one or more client systems 124 across a local factory network (e.g., DeviceNet, ControlNet, Ethernet, DH+, Intranet) and/or a public network 130 such as the Internet. This can also include other communications options such as phone connections and/or wireless interactions. A processor 134 (or processors) in the controller 120 executes from an associated memory subsystem 138 that can include an operating system (e.g., Microsoft® Windows® NT/2000/XP, Windows CE, Linux, .NET, OS-9, UNIX, VRTX, QNX, VxWorks, CE.NET, custom-designed). The controller 120 can also communicate to and control various Input/Output subsystems 140 and/or other networks (e.g., Analog, Digital, Programmed/Intelligent I/O modules, other programmable controllers, communications modules, networks).

The client system 124 includes at least one application 144 that interacts with a client communications component 150 (e.g., RSLINX®) to exchange data with the controller 120 via a communications component 154 suitably adapted to transfer information on the network 130. As illustrated, one or more interactions 160 can be monitored (e.g., data sent or received) to/from the controller 120 (or other control components, databases) in response to instructions or commands executed by the application 144. The application 144 can include substantially any type of software for manipulating the interactions 160 such as an editor tool (e.g., RSLOGIX®) or other applications which are described in more detail below, whereby the interactions 160 are generally processed on a local memory or storage device 164. This can include such interactions as creating, viewing and/or modifying controller programs or memory that are generally a by-product of the interactions 160.

In accordance with one aspect of the present invention, a recording and tracking component 170 (can be separate components as described above) is provided to record and store data associated with the interactions 160 on a server database 174 and retrieve the data therefrom for automated auditing purposes (e.g., can include commercially available SQL server). It is noted that transactions with the server database 174 can also be recorded as interactions even though the transactions may not affect the controller 120 (e.g., record that a program was uploaded to the client 124, modified, and saved on the database 174 even though program was never downloaded to controller 120). The data relating to the interactions 160 can be stored as database elements 180 (e.g., SQL elements, XML schema, data structures) describing controller interactions and associated activities affecting the controller and/or other industrial control components. In addition, metadata can be associated with the database elements 180 that describe supervisory aspects of the present invention in order that database manipulation activities are recorded for control and security purposes. Before the database elements 180 can be retrieved from the database server 174 (or stored therein), a login and authentication procedure may be performed via the recording and tracking component 170 (or other application) to determine if a respective user of the application 144 has the authority to access such data.

If the user has logged-on successfully (e.g., entered a suitable pass-phrase) and been authenticated to remove/update a database file (e.g., tag associated with metadata indicating logged-in user has access rights to file), the user can perform a check-out operation to retrieve one or more desired database files from the database 174 as a working file (not shown) in the local memory 164. The user can then perform operations such as edits to the working file on the client system 124 (and local memory 164) via associated application 144 and can download the working file to the controller 120 for testing or program operations, if desired. As can be appreciated, all activities such as uploading files from the database server 174, manipulating such files, downloading/uploading images, and/or manipulating elements within the controller 120 are recorded by the recoding and tracking component 170, wherein such activities or interactions are stored as the database elements 180 to preserve audit information about control system changes that may have occurred in the system 100.

It is noted that the recording and tracking component 170 can act as an intermediary component between the application 144 and the database 174. As such, a separate communications network 184 (or software channel/socket) can exist between the recording and tracking component 170 and database 174, if desired. In another aspect, the recording and tracking component 170 can communicate through the client communications component 150 and network 130 to transfer information to and from the database 174. In addition, the recording and tracking component 170 can be provided as a re-locatable object wherein the object is operated on various or different platforms/applications to monitor industrial control activities and achieve access to the database 174. As one example, the recording and tracking component 170 can be located and/or operated in the memory subsystem 138 of the controller 120.

In another aspect of the present invention, the interactions 160 can be generated by and/or operated upon via one or more auxiliary control systems or control support systems illustrated at reference numeral 190. For example, the systems at 190 which can also have interactions 160 stored and retrieved from the database 174 include CAD systems, drives, and/or other control systems such as robotic systems or advanced manufacturing cells.

Figure 3:
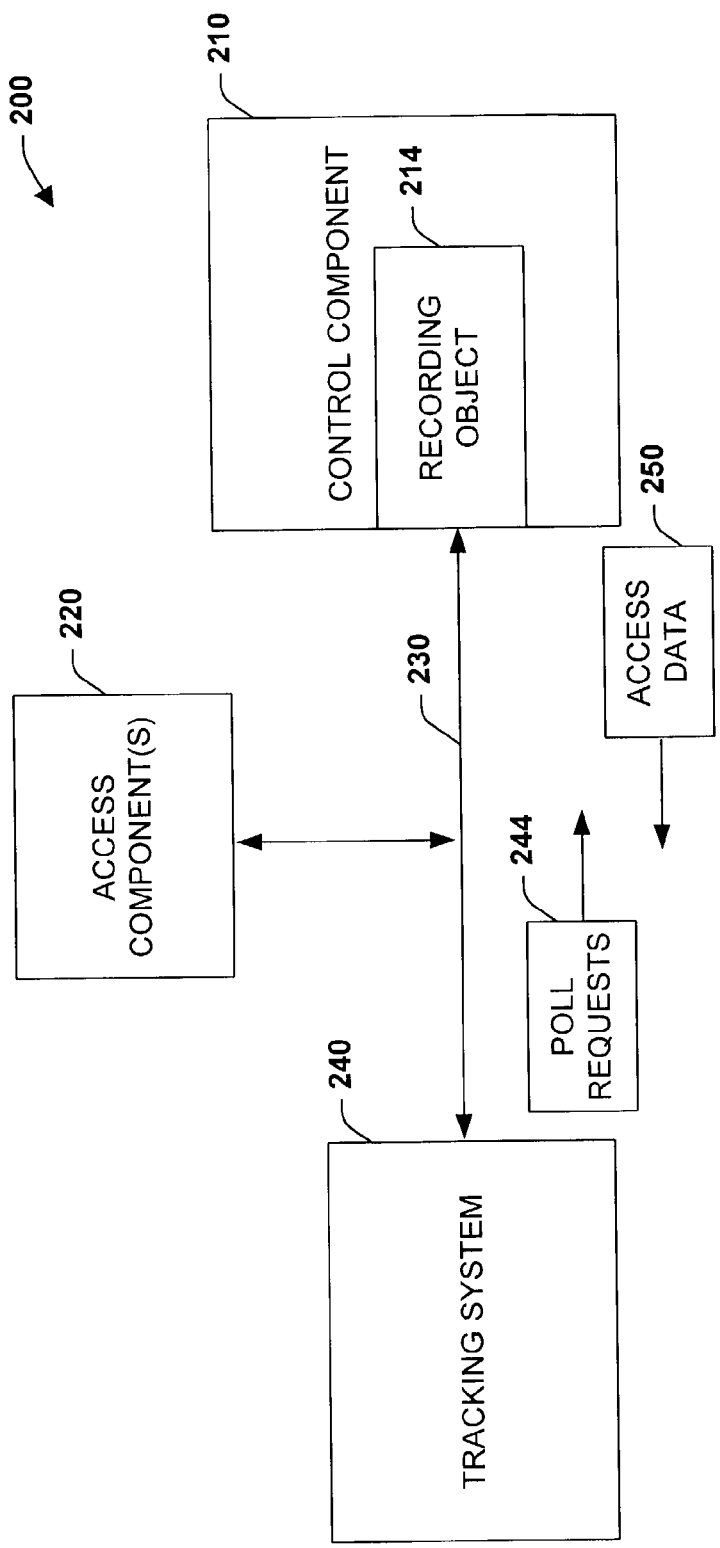
FIG. 3 is a schematic block diagram illustrating an alternative audit recording and tracking system in accordance with an aspect of the present invention.

Turning now to FIG. 3, an alternative audit recording and tracking system 200 is illustrated in accordance with an aspect of the present invention. A control component 210 such as a programmable logic controller (PLC) or other industrial component includes a recording object 214 that logs or records control access from one or more access components 220. The access components 220 can include any type of application and/or hardware that can communicate to the control component via a network 230 (also includes wireless interactions). The recording object 214 can report interactions attempted by the access components 220 on an event-driven bases, on a periodic basis, and/or as polled from the control component 210. The attempted (or actual) interactions can be stored in an electronic record associated with the control component 210 in a tracking system or database 240 (e.g., file labeled with control component identifier). For example, the tracking system 240 can automatically generate poll requests 244 to acquire access data 250 from the recording object 214. Alternatively, the recording object 214 can automatically generate the access data 250 on an event-driven basis such as after/during a respective interaction with the access components 220. Furthermore, such access data 250 can be generated by the recording object 250 on a periodic basis, such as a time or calendar driven event. As can be appreciated, the tracking system 240 can similarly generate poll requests 244 on an event driven or periodic basis and/or at the behest of a user initiated request via a user interface (not shown).

It is noted that the recording object 214 residing on the control component 210 can be applied in wireless and/or hand held device applications that may interact with the control yet, not receive consistent interactions with the tracking system 240 for recording such changes. In another aspect, the recording object 250 may serve as a back-up or check to a master database that has recorded interactions with the control component 210. If recorded changes registered at the control component 210 do not match recorded changes at the master database such as the tracking system 240, further auditing procedures can be initiated (e.g., initiate other auditing processes to determine why control component 210 does not match database records at the tracking system 240).

Figure 4:
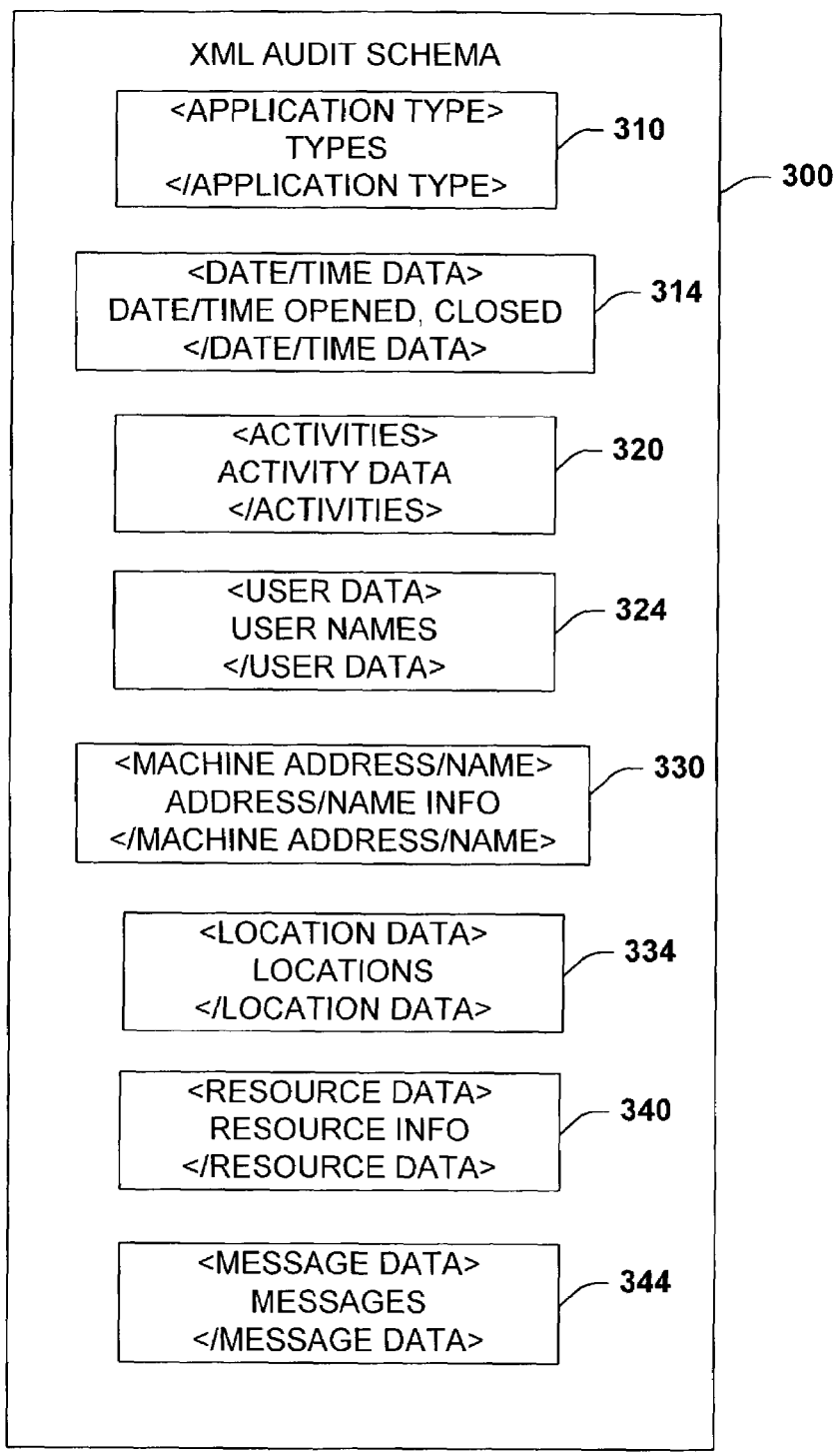
FIG. 4 illustrates an exemplary audit schema in accordance with an aspect of the present invention.

FIG. 4 illustrates an exemplary schema in accordance with the present invention. Although the schema represents one possible manner in which to transfer data to and from a database or control component, it is to be appreciated that other possible data transfer mechanisms may be employed. For example, data can be transmitted in the form of binary or other type data packets that convey configuration and/or status information in accordance with the present invention.

Referring now to FIG. 4, an audit schema 300 is illustrated in accordance with an aspect of the present invention. The audit schema 300 includes one or more XML elements 310 through 344 (defined by starting and ending tags with (</> symbols), arranged in substantially any order) that relate to one or more activity or interaction items that provide information to facilitate electronic auditing and tracking of industrial control systems and components. Although not shown, the XML elements and associated tags can also include attribute information if desired, wherein an attribute is a name-value pair associated with an element start tag (e.g., <application type="monitoring component">).

At 310, an application type element is provided. This can include a plurality of types such as maintenance tool, editing tool, programming tool, interface and so forth. At 314, date and/or time information is provided to record when activities have started and stopped. At 320, an activities element is provided that records items such as an application has started or stopped, a file has been opened or closed, a rung has been altered, a user has logged on or off, a bit has changed, and so forth. It is noted that one or more of the schema elements described herein may be combined. For example, the activity data at 320 may be combined with the date/time data of 314, if desired. At 324, user data is provided that relates to a name, identity, or function of a user who has accessed a respective industrial control component via the above described applications. At 430, machine address and/or name information can be provided to indicate a physical and/or network location for the respective industrial control component being accessed. At 334, a location element indicates where the application that accessed the industrial control component was being operated from (e.g., Network/Local Drive: apps/tools/tool.exe). At 340, a resource data element can be provided. This can include information regarding related applications or files that are also being manipulated by the application that is currently accessing the industrial control component. At 344, message data can be provided. This can include automatically and/or manually generated notes regarding the current application session (e.g., Application has opened, Application has saved a file, Application has ended, a rung has changed, a bit was forced, and so forth).

Figure 5:
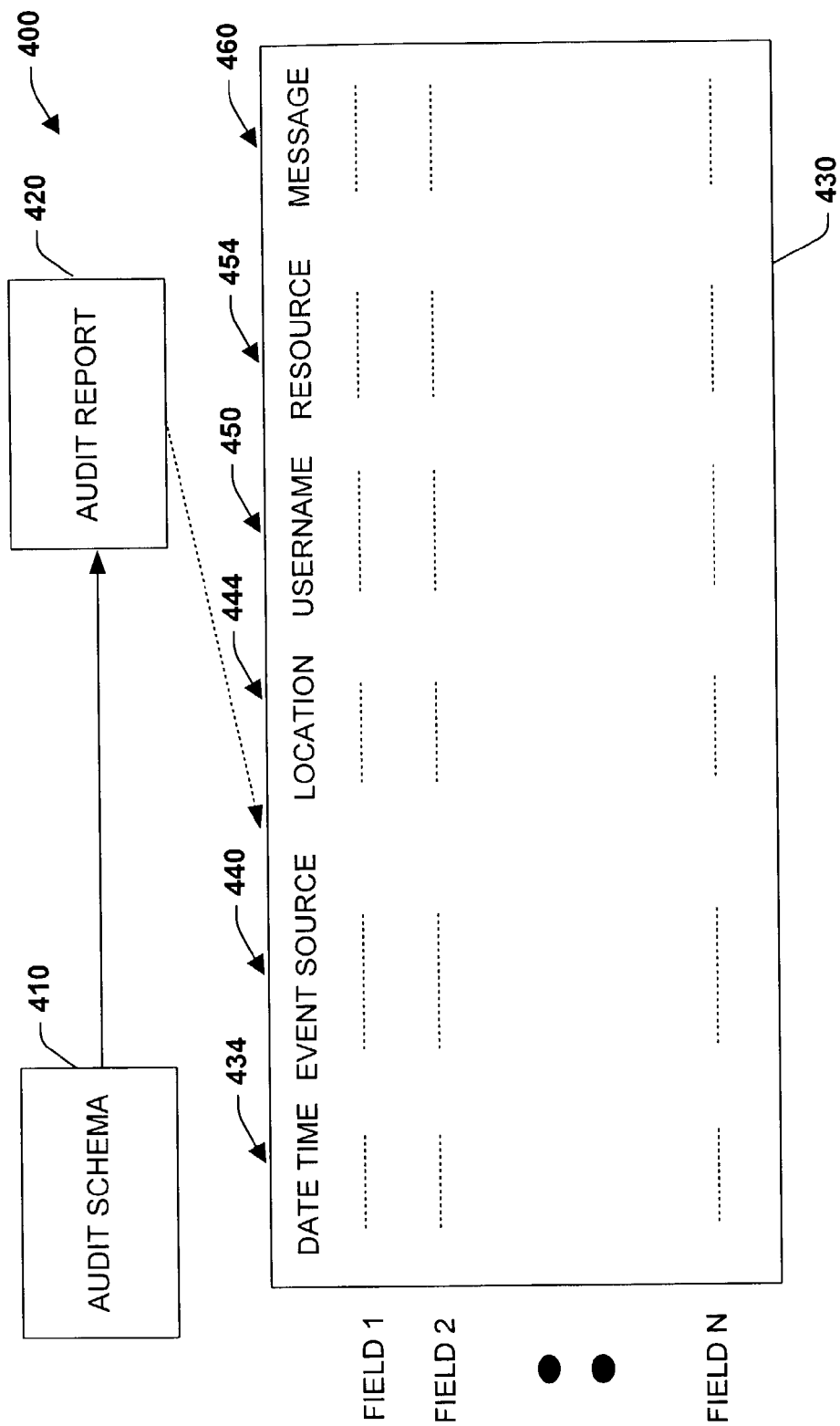
FIG. 5 illustrates an exemplary audit report system in accordance with an aspect of the present invention.

FIG. 5 illustrates an audit report system 400 in accordance with an aspect of the present invention. An audit schema 410 as described above, (or other type data structure) can be employed to automatically generate an audit report 420 that describes interactions and/or activities that have occurred with various control components. An example audit report is illustrated at 430. Such report can include 1 to N fields, N being an integer, displaying a plurality of different types of auditing information or data. As one possible format, date and time information can be provided at 434, event source or application information provided at 440, location information provided at 444, username information provided at 450, resource information provided at 454, and/or message information provided at 460. It is to be appreciated that more or less data types can be displayed than illustrated in the example report 430. In addition, respective data or display orderings within a respective field can be changed, moved, re-ordered, and/or reformatted as desired. Such data can be presented in an electronic format such as a Web Browser, GUI, or spreadsheet and/or can be printed or electronically transmitted to another domain if desired, depending on process or regulation requirements.

Figure 6:
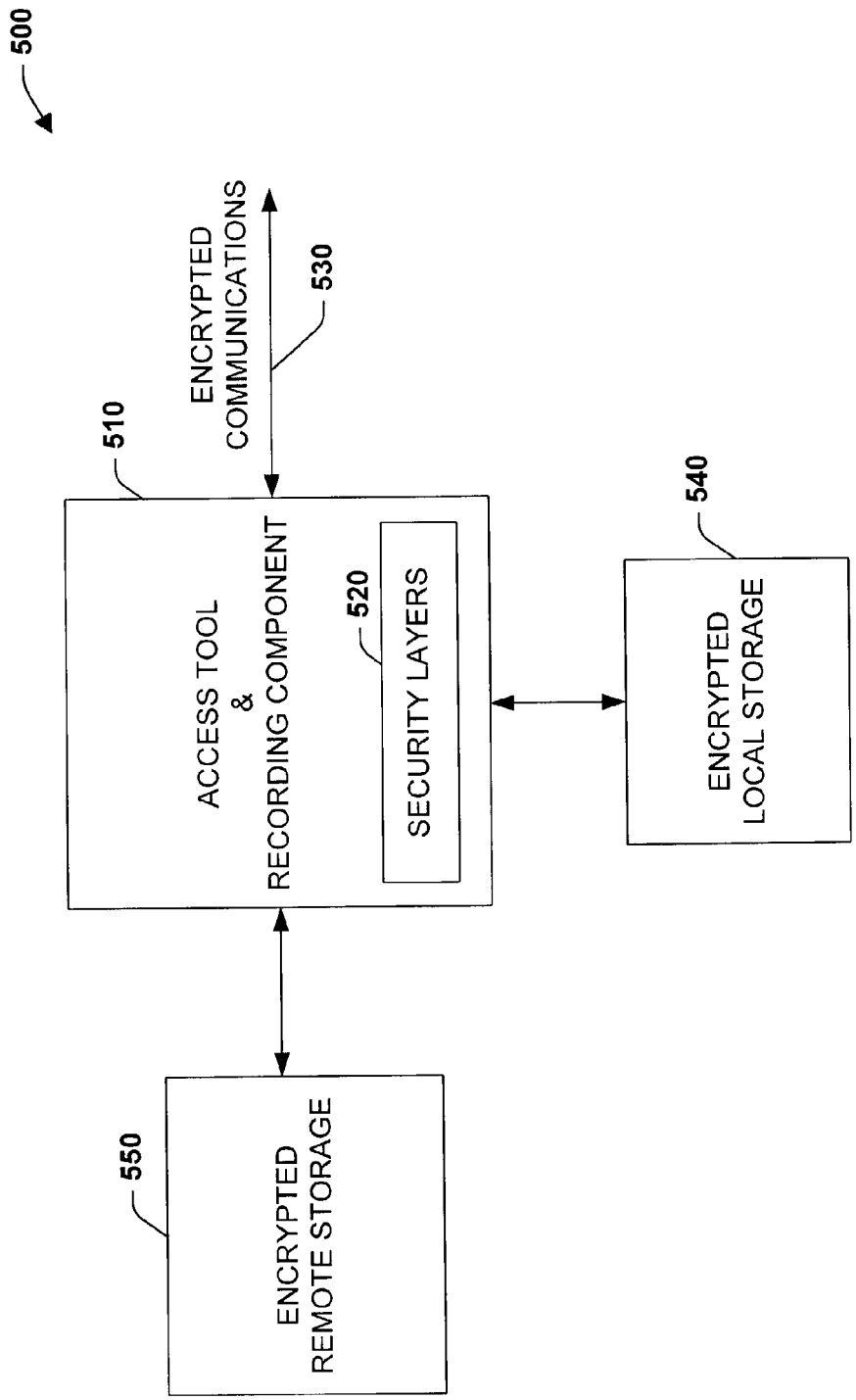
FIG. 6 is a schematic block diagram illustrating security operations in accordance with an aspect of the present invention.

FIG. 6 is a system 500 illustrating security operations in accordance with an aspect of the present invention. An access tool 510 having an associated recording component can employ one or more security layers 520 such as encryption techniques, authentication and/or authorization techniques, and/or other security measures when communicating activity data over a network 530. In addition, such security layers 520 can be applied when communicating with, or storing data in a local and/or remote storage location 540 and 550, respectively, wherein the data stored therein may also be stored in an encrypted or substantially secure format. The security layers 520 can include one or more trust components (not shown) to provide machine authentication, an encryption component (not shown) to provide user authentication, authorization, and data encryption, and a policy component (not shown) to facilitate varying levels of data access (e.g., restrict data access of specified machines and/or persons according to selected security policies). Other aspects can include enabling one or more components to analyze received data, providing segmented security areas within controllers or databases having various security mappings or permissions, and maintaining subnet lists specifying valid machine and/or data access addresses. Still other security layers 520 can include virtual private networks mitigating unauthorized access, encapsulation protocols shielding underlying control protocols, and LAN-locked layers mitigating access from public networks.

In accordance with one aspect of the present invention, security components such as public keys and trusted certificates can be provided to establish a trust between network-based components attempting to communicate within an industrial controller environment. This can include employment of such security components as an Internet Key Exchange (IKE), Internet Protocol Security (IPSEC), Kerberos, one or more security policies, Secure Socket Layers (SSL) and/or other security components in order to limit data access by non-trusted parties. Encryption technologies can be employed in establishing trust relationships, mitigating unwanted data access of private data, and encapsulating control or audit data within a security packet. This can include encapsulating local and/or other network protocols within an encrypted transmission stream that includes such protocols as Ethernet (e.g., IEEE802.3, TCP/IP, UDP, EtherNet/IP, and so forth), ControlNet®, DeviceNet®, Data Highway (DH)/DH+, CIP, and/or other network protocols (e.g., Foundation Fieldbus (H1 and Fast Ethernet) Modbus/TCP, Profibus). Industrial components communicating via networks 530 can be configured in accordance with one or more desired levels of security and/or security layers 520. The security layers 520 can be selected in various combinations with respective layers having one or more associated security components. Data access can be stringently or generously permitted (or there between if desired) according to the selected security layer, layer combination, and/or security components associated with respective layers. Encryption algorithms within the security layers 520 can include DES and 3DES technologies, whereas an integrity algorithm may include MD5 and SHA-1 technology, for example. Authentication methods can employ Kerberos or certificates, whereas some communications may also include Diffie-Hellman exchanges, for example.

Figure 7:
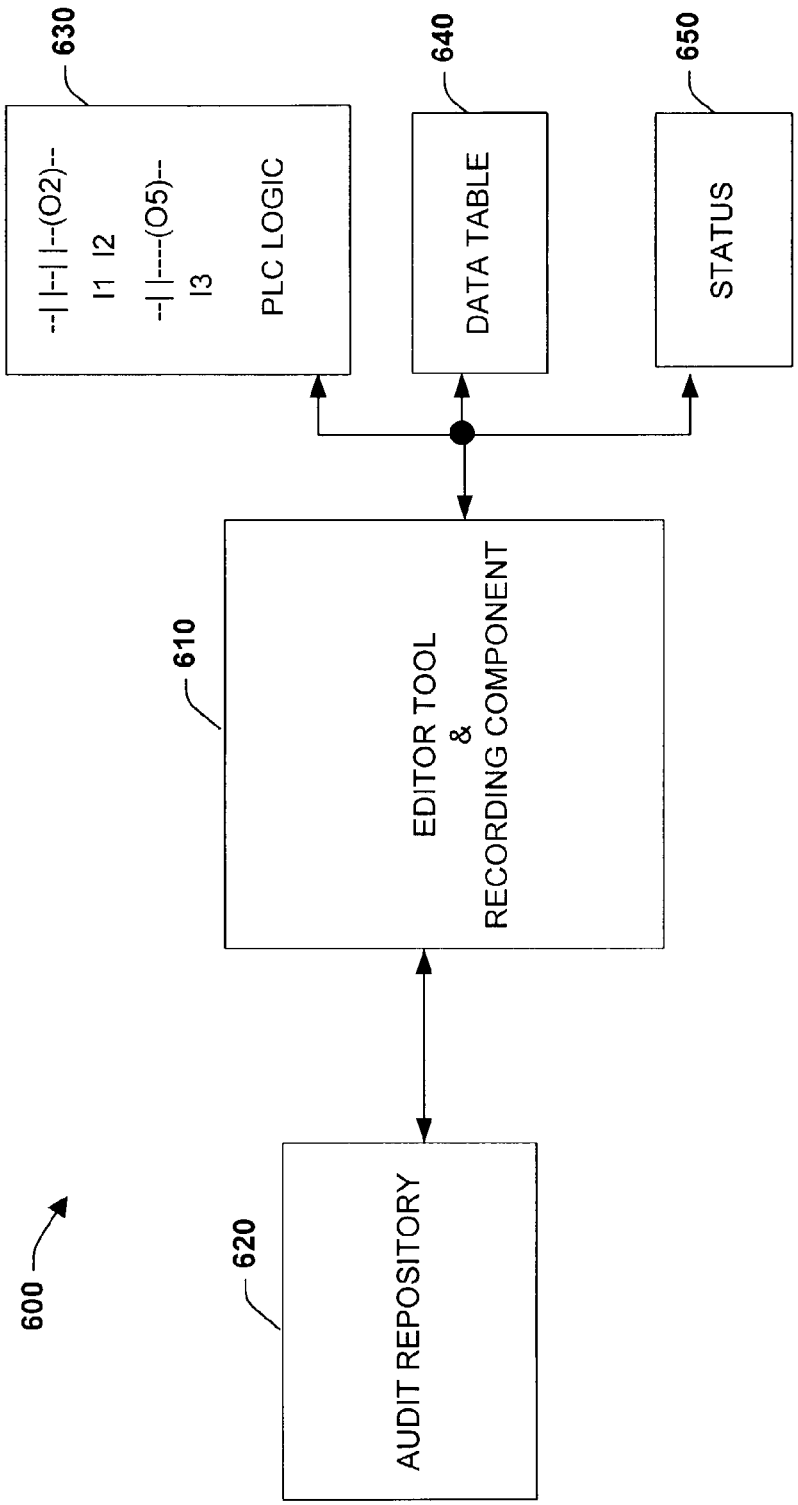
FIG. 7 illustrates an exemplary editing session in accordance with an aspect of the present invention.

FIG. 7 illustrates an exemplary editing session 600 in accordance with an aspect of the present invention. In this example, an editor tool 610 having an associated recording component logs real time activities of the tool in an audit repository 620. As an example of such activities, a PLC ladder program is illustrated at 630. Such programs can include rungs, instructions and other elements that define or control PLC operations. In addition to the program changes that can be monitored and logged in the repository 620, PLC data table changes illustrated at 640 can also be monitored and recorded. At 650, PLC status changes can be similarly monitored and stored in the audit repository 620. For example, such status as online/offline indications, forcing status, communications status, fault status, batch or event status, and/or other type status affecting PLC operations or interactions can be monitored and stored in the repository 620.

Figure 8:
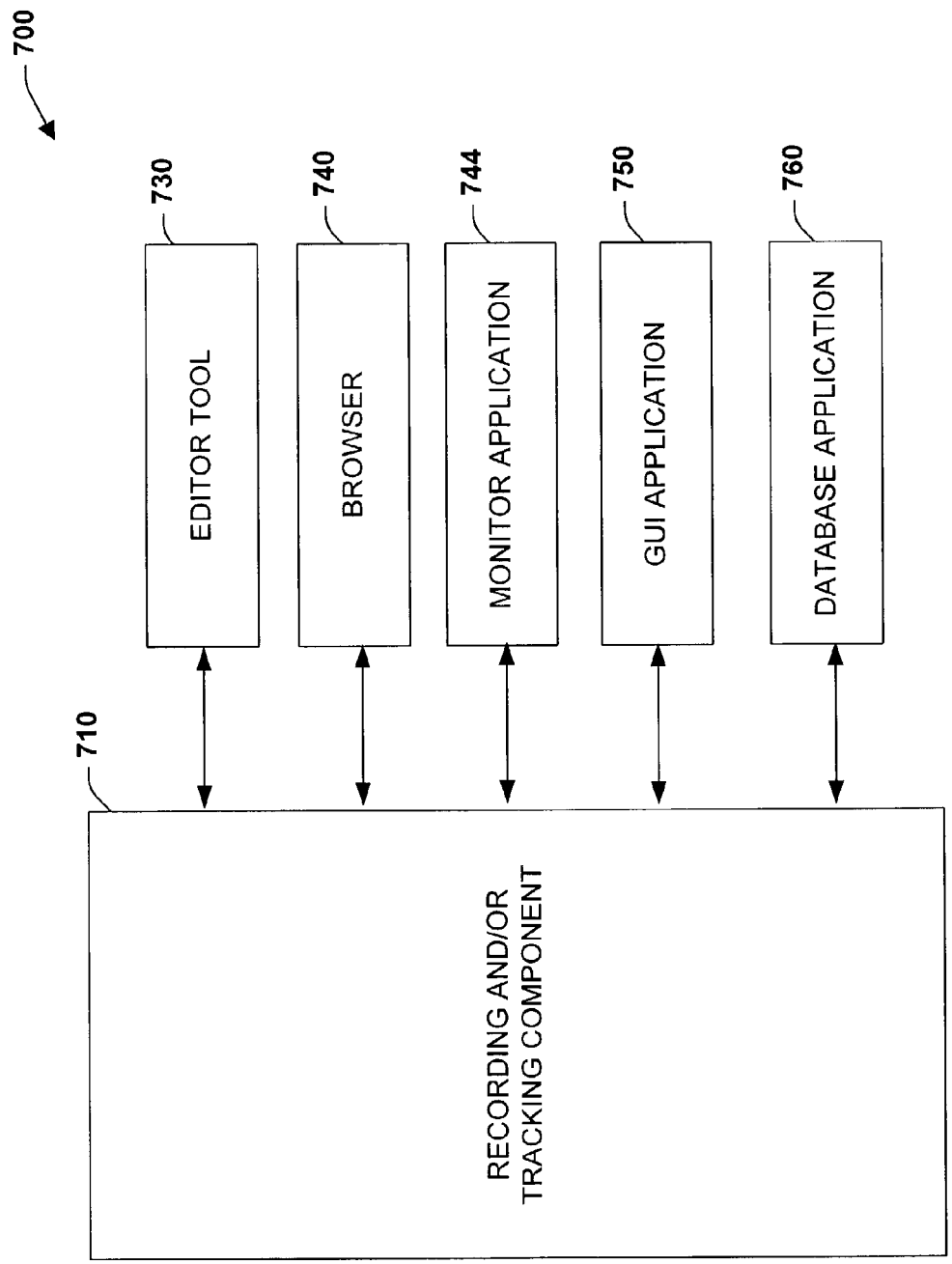
FIG. 8 illustrates various applications that can be employed with an audit recording and/or tracking component in accordance with an aspect of the present invention.

FIG. 8 is a diagram 700 illustrating various applications that can be employed with a recording and/or tracking component 710 (also referred to as an RT component 710) in accordance with an aspect of the present invention. The RT component 710 is employed to record and track interaction data and control access to a database server. In conjunction with the RT component 710, various applications can be utilized. As described above, an editor tool 730 can be provided to retrieve, view, and/or modify one or more images and/or controller elements. Such tools can be provided as PLC program editors, wherein program variables and/or logic instructions are added, removed, and/or modified on a client machine (or server) that operates such editing application. Another type application that can be utilized with the RT component 710 is a browser application 740. The browser 740 can be employed from a remote location such as a remote client system operating across the Internet, for example. It is noted that substantially any application can operate with the RT component 710 to access/modify control system components, wherein the RT component and associated application operates on the same machine or alternatively, these components operate on separate machines. For example, the RT component 710 could be operating on a client machine that communicates to a database server and the browser 740 accesses the client machine from an Internet browser before gaining access to the database server via the client machine.

At 744, a monitor or other type communications application 744 can be provided. Such applications can be in communication with a PLC for example, and monitor for status or maintenance type of activities. If a problem is detected with the PLC, images may be accessed from the database automatically and/or manually to provide assistance in diagnosing or troubleshooting the PLC. For example, diagnostic images may be retrieved from the database and subsequently loaded on the PLC in order to determine a potential problem or place the PLC in a desired troubleshooting state in order that further diagnosis can occur. In addition, if a problem or other type of status event is detected on the PLC, the monitor application 744 can store an image of the PLC on the database at about the time the event occurred. The stored image can then be retrieved and inspected to determine possible causes relating to the detected event.

At 750, a Graphical User Interface (GUI) application may be provided. This can include substantially any type of application that sends, retrieves, and/or manipulates industrial control components in accordance with client side interfaces presented in graphical form to a user. For example, such interfaces can be employed with the applications previously described such as an editor tool or browser although other type applications can be utilized. The GUI 750 can provide one or more display objects (not shown) including such aspects as configurable icons, buttons, sliders, input boxes, selection options, menus, tabs and so forth having multiple configurable dimensions, shapes, colors, text, data and sounds to facilitate operations with the images, database server and/or client system. In addition, the GUI 750 can also include a plurality of other inputs or controls for adjusting and configuring one or more aspects of the present invention. This can include receiving user commands from a mouse, keyboard, speech input, web site, remote web service and/or other device such as a camera or video input to affect or modify operations of the interface 750.

Proceeding to 760, a database application can be provided in accordance with the present invention. Database applications 760 can include substantially any type application that can store, retrieve, and/or manipulate industrial control information on the database server.

Figure 9:
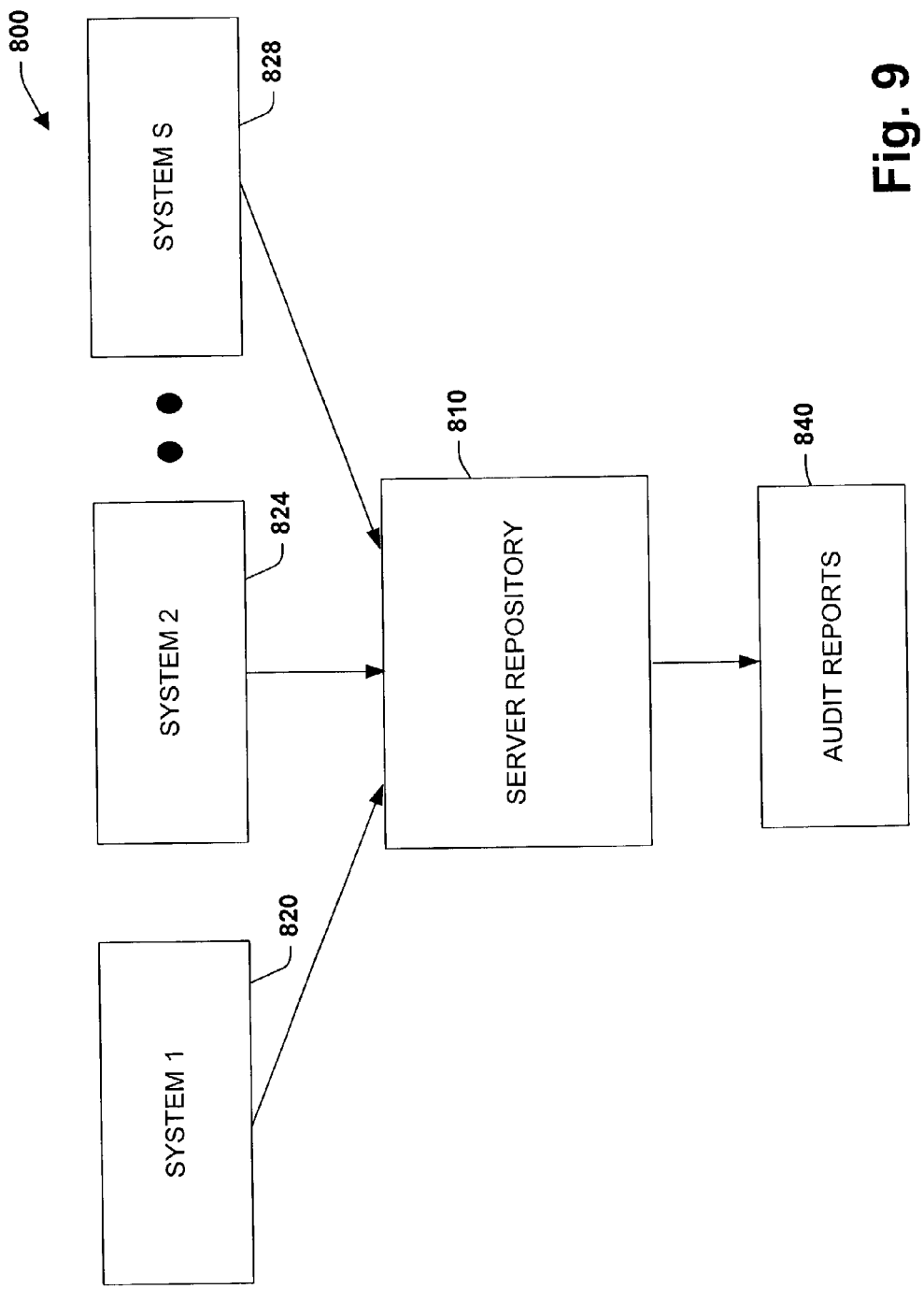
FIG. 9 illustrates an audit aggregating system in accordance with an aspect of the present invention.

FIG. 9 illustrates an audit aggregating system 800 in accordance with an aspect of the present invention. A server repository 810 (e.g., SQL database server) receives audit data that has been recorded from one or more industrial control systems 820–828 (and/or systems associated therewith such as remote computer systems interacting with the industrial control systems). The audit data can be tagged or named with an identifier relating to the respective system. For example, System$_1$ at 820 may be tagged as System$_1$_Audit_Data. When audit data has been collected or aggregated from the respective systems 820–828, the server repository 810 generates one or more audit reports 840 from the aggregated data. Audit reports may be generated as an electronic file and transmitted over the Internet or local network for example, and/or can be generated as a print out that can be observed and filed as desired. Moreover, statistical and/or mathematical analysis may be applied to the audit reports 840 and associated audit data to further determine whether industrial control processes are meeting, exceeding, or below existing and/or emerging regulations, standards, or quality thresholds. As can be appreciated, the audit reports 840 may be generated for a single system, for a combination of systems, and/or for all the systems 820–828 that report audit data to the server repository 840.

Figure 10:
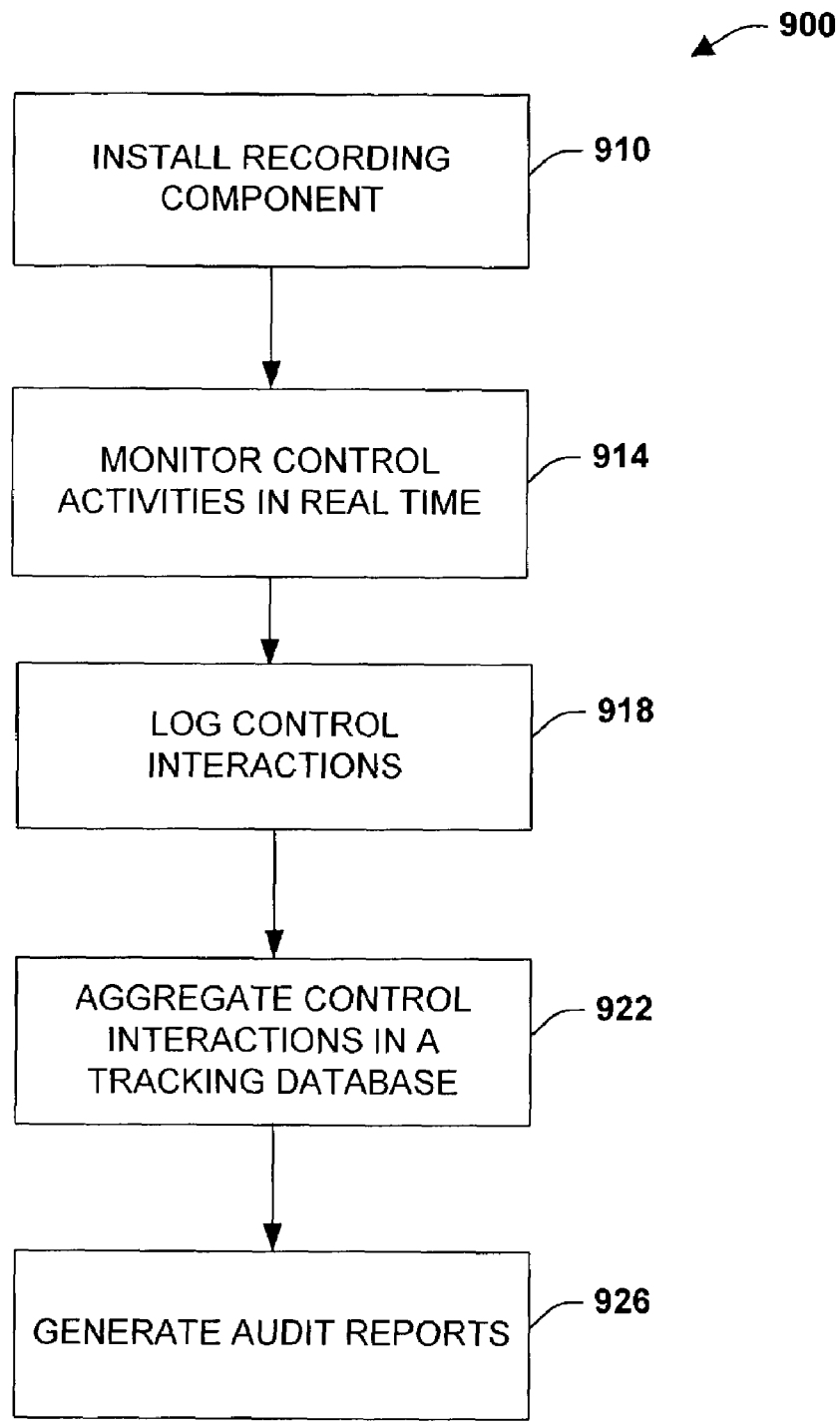
FIG. 10 illustrates an audit tracking and reporting methodology in accordance with an aspect of the present invention.

FIG. 10 illustrates an audit and tracking methodology 900 in accordance with the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring now to FIG. 10, and proceeding to 910, a recording component is installed and is operable with a client system application that interacts with an industrial control component. As noted above, the recording component can also be installed as an object on the industrial control component, wherein audit data is collected and subsequently received from the component. At 914, industrial control component activities are monitored in real time. Thus, events such as logging-on or off, bit manipulations, logic changes, going on line/off line with a controller or communications module, and so forth are monitored as the events occur. At 918, the activities monitored at 914 are logged in a local and/or remote database in a file or data structure that captures the activities during a current application session as described above. At 922, the control interactions that were logged in 918 are aggregated in a tracking database along with other past activities that were logged for a respective industrial control component.

As an example, a controller A_B may have been accessed on Monday, wherein a first log is created and stored in the tracking database having a name "Controller A_B_activity_data". When controller A_B is accessed again on Thursday, the log Controller A_B_activity_data is then updated to include Thursday's activities. Thus, activity and audit data is accumulated or aggregated over time for a respective industrial control component in the tracking database. At 926, audit reports are generated from the aggregated data described above. This can include automatically generated reports, wherein reports are generated on an event-driven or periodic basis and/or can include manual requests for the reports, such as requesting a report record as a selection option from a user interface, for example.

Figure 11:
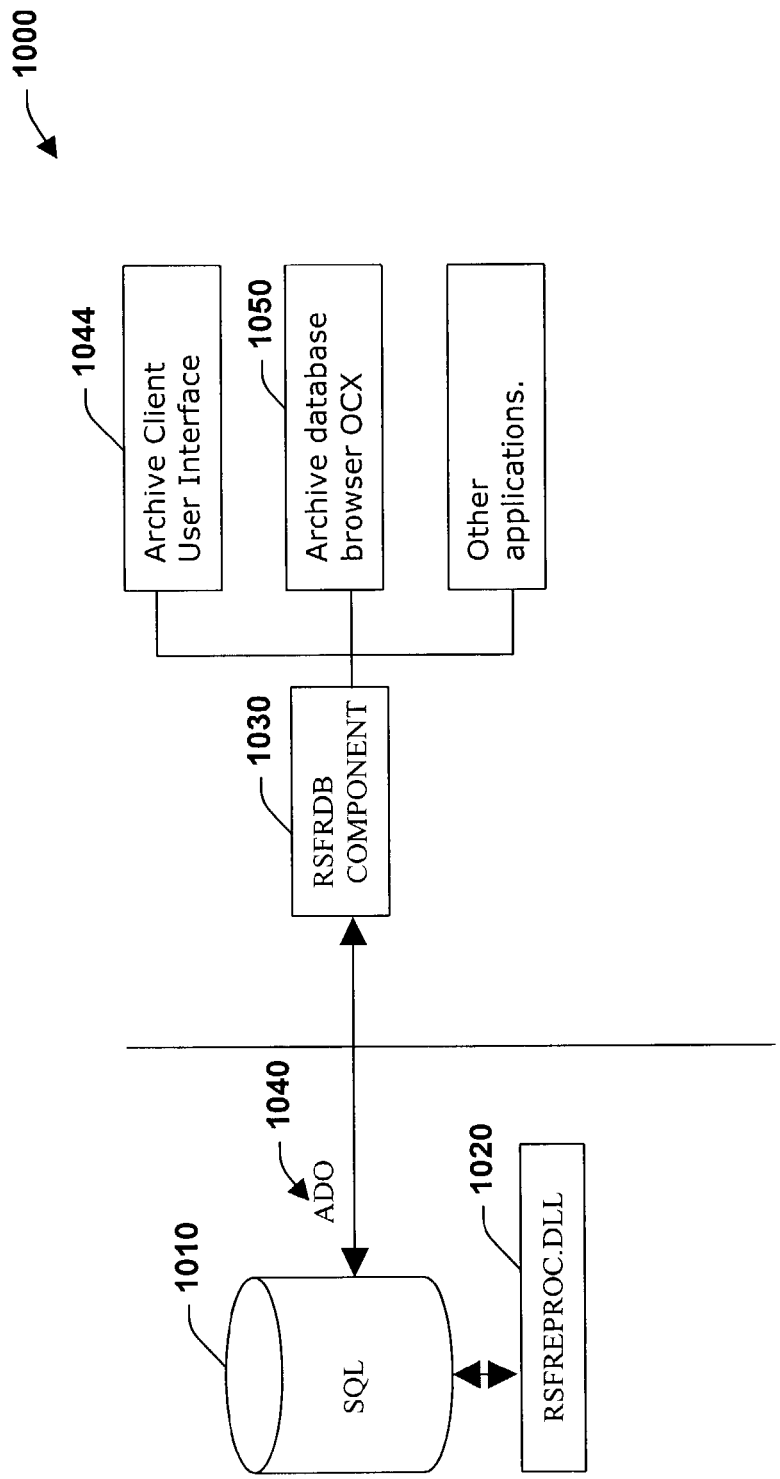
FIG. 11 is a diagram illustrating database objects in accordance with the present invention.
Figure 12:
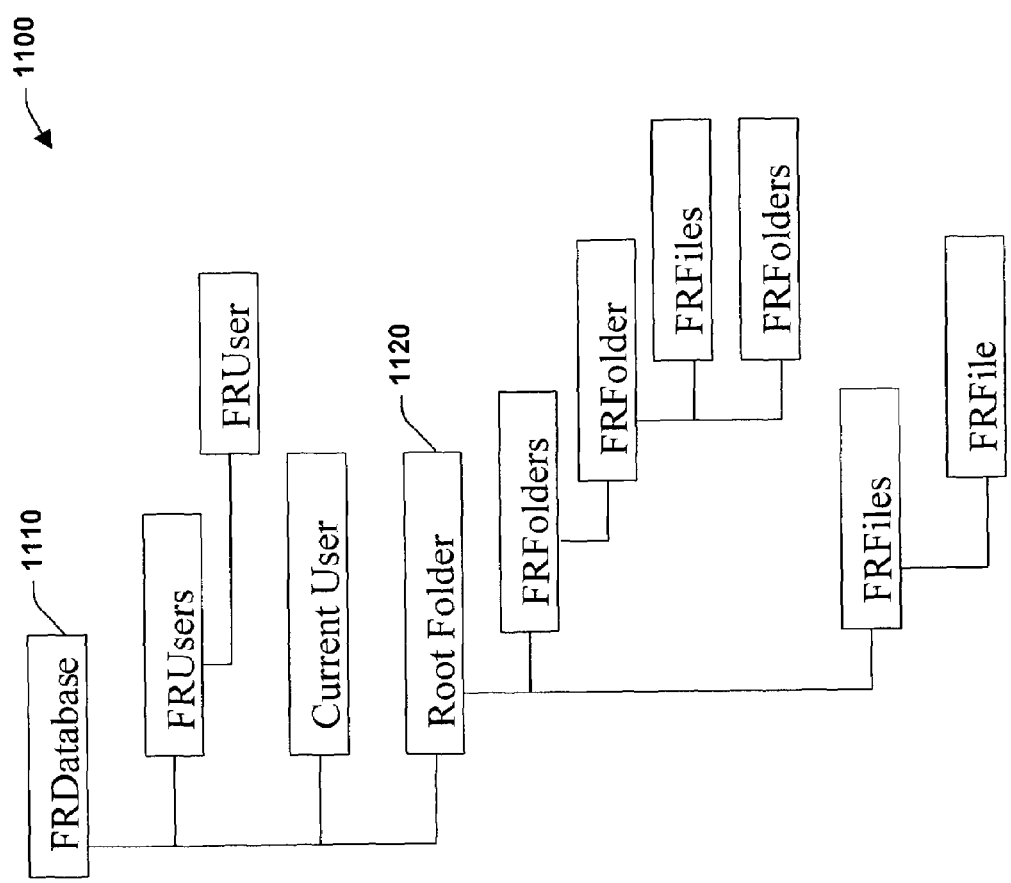
FIG. 12 is a diagram illustrating a database structure in accordance with the present invention.

FIGS. 11 and 12 illustrate exemplary implementations of the present invention that can be employed with the database concepts, file management, and objects or components previously described. These components can be provided as part of an Archive Module or system that is a SQL Server based repository of files and projects with support for auditing, tracking, archiving and version control. Users can store and maintain archives of their files such as RSLogix files, Document files, Audit files and so forth in a hierarchical 'Folder/File' paradigm. The present invention supports all types of file formats. The system offers 'Folder' level security for stored files, wherein a detailed log of activities for a file/folder are maintained. Whenever a user performs an action on a file, such as Check-In, Check-Out, Rename, etc., a log entry is maintained indicating who did what and when to the file/folder. Some of the components described can be provided as part of commercially available systems such as for example:

Server Operating Systems
    Windows 2000 Professional or Server

Client Operating Systems
    Windows 2000 Professional or Server
    WindowsNT 4.0 SP 6
    WindowsXP Networking Support
    TCP/IP based Windows Domain Network can be provided for multiple client computers support. For single workstation, it is not essential.

Database Server
    Microsoft (or other vendor) SQL Server 2000 Standard or Enterprise FIG. 11 illustrates an Archive Module system 1000 which provides a multi-user solution based on an SQL Server 2000 backend database. A server 1010 includes a Microsoft SQL Server 2000, for example, and a RSFREPROC.DLL 1020. This DLL may be employed by some of the stored procedures of the database (e.g., storing interaction data with associated metadata). The basic Client/Server relationships and layout are illustrated by the system 1000, although as noted above, other arrangements are possible (e.g., client object operating from various locations/machines)

The system 1000 includes a database client component 1030 (e.g., RSFRDB.DLL) and connects to the server 1010 employing ActiveX Data Objects 1040 (e.g., ADO Version 2.6 or higher, or other communications object) and utilizes a native SQL OLE DB driver. One or more user level interfaces such as an Archive Client 1044, and Archive Browser OCX 1050 utilize the data access DLL 1030 to interact with the repository 1010 and its objects.

The RSFREPROC.DLL 1020 (extended procedures dll) contains procedures that the database stored procedures employ to interact with an operating system, wherein the built-in SQL facilities cannot fulfill the needs (e.g., processing of real time interaction data). The database 1010 can be created via a utility that creates the specified database and all the required database objects.

The RSFRDB.DLL 1030 component operates as an audit recording and/or tracking component described above. This is the core client side component of the audit system. Generally, all database interactions should be routed through this component. Thus, client applications should not call database procedures or alter tables directly. The component 1030 can be provided as an ActiveX component operating as an object model to interact with database objects. This component supports IDispatch and custom interfaces, for example, (e.g., Dual Interfaced) Client applications can use either type interface (or other types), if desired The client user interface 1044 is a fully functional default client interface for end users. This user interface is an ActiveX document that client applications host. This interface 1044 can be employed by the user to manage folders, view activity logs and so forth. The browser OCX 1050 includes ActiveX control and is provided for applications integrating into audit system services. It provides a familiar 'Windows File Open Dialog' like interface that can be utilized for browsing the database 1010.

The system 1000 employs various security aspects. In general, there are two parts to database security. In one aspect, 'Who' has access to the SQL Server and database 1010. Second, what folders can that user access and use. Typically, all users who need to access the system can be added to the SQL Server/Database 1010 employing an Archive Administration Utility (e.g., MMC Snap in). These users generally must be Windows Domain users—native SQL logins are not supported. The system 1000 also supports domain groups. When added to the system, these users have Module Admin or regular user rights, for example.

Admin users can add/remove users and modify folder rights. Folder rights describe/permit 'what' level of access a user has to a particular folder object and its contents. For example, the following table lists exemplary rights that can apply to a folder object:

| Rights | Description |
| --- | --- |
| None | No rights defined. User cannot do anything to the folder. |
| Read | User has read only access to folder and its contents. |
| Check In/ Check out | User can check in or out the folder or its contents. |
| Add | User can add files and folders to the folder. |
| Destroy | User can permanently destroy the folder or its contents. |
| Inherited | User's rights to this folder are inherited from the folders parent folder. This is not applicable to the root 'File Repository' folder. |

Folder rights can be set by the administrator employing an Admin Utility MMC snap in or the Archive client user interface 1044. Method calls that rely upon users having correct rights will return E_ACCESSDENIED error if a rights check fails.

The basic object model for the client component 1030 is illustrated at 1100 of FIG. 12. A top-level object is FRDatabase at 1110. This object is the root object that is generally instantiated first. Using this object 1110, enables traversing down a Folders/Files hierarchy tree illustrated at 1100. The database object generally contains a 'Root Folder' object at 1120 that is available provided the database has been installed correctly. This folder's name is 'File Repository' and has an ID of '00000000-0000-0000-0000-000000000000'. Respective objects (File or folder) in the database is identified by a GUID (Globally Unique ID) and is unique for each object. There is typically no limit imposed on how many files or folders that can be contained in the database. It is dependant on external parameters like memory, disk space etc. of the server and the client computers.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An electronic audit system for an industrial control environment, comprising:
   a recording component to log real time interactions with one or more industrial control components; and
   a tracking component to aggregate the real time interactions to facilitate generation of audit data relating to the one or more industrial control components.

2. The system of claim 1, at least one of the recording component and the tracking component are associated with an access tool that interacts with the one or more industrial control components via a network.

3. The system of claim 2, the access tool includes at least one of an editing tool, a programming tool, a communications component, a monitoring component, a maintenance component, a browser, a graphical user interface (GUI), and a database application that interacts with the one or more industrial control components.

4. The system of claim 3, the one or more industrial control components include at least one of a programmable logic controller (PLC), a communications module, an I/O module, an application, a CAD system, a drive system, a robotic system, and a manufacturing cell.

5. The system of claim 2, the network includes at least one of a local factory network, a wireless network, and a public network.

6. The system of claim 2, the recording component logs interaction data that has been directed to the one or more industrial control components during a current application session associated with the access tool.

7. The system of claim 6, the interaction data includes at least one of access dates, access times, applications that have attempted access, user names, online/offline status, when the applications have started and stopped, what other files were invoked, opened, or saved by the application, and the type of access being directed to the one or more industrial control components.

8. The system of claim 7, the type of access includes at least one forcing operation, changing, logic program changes, status changes such as run/program mode changes, and memory alterations.

9. The system of claim 1, the tracking component aggregates activities logged by the recording component in at least one of a local storage and a remote storage location.

10. The system of claim 9, the tracking component aggregates transaction data by creating at least one of a file, schema, and a data structure in the local or remote storage locations, and tags the file, schema, and data structure with an identifier relating to the one or more industrial control components that have been accessed.

11. The system of claim 1, the recording component is located within at least one of a remote network component and within the one or more industrial control components.

12. The system of claim 11, the recording component reports interactions attempted by one or more access components in accordance with at least one of an event-driven basis, a periodic basis, and as polled from the one or more industrial control components.

13. The system of claim 11, the recording component serves as a back-up to a master database that has recorded interactions with the one or more industrial control components.

14. The system of claim 1, at least one of the recording component and the tracking component are employed to generate an audit report that describes interactions that have occurred with the one or more industrial control components.

15. The system of claim 14, the audit report is employed as part of an electronic validation procedure to facilitate compliance with one or more regulations.

16. The system of claim 14, the audit report includes 1 to N fields, N being an integer, the fields displaying various types of auditing information.

17. The system of claim 16, the audit report includes at least one of date and time information, event source information, location information, username information, resource information, and message information.

18. The system of claim 14, the audit report is presented in a format such as at least one of a Web Browser, a GUI, and a spreadsheet, and a print out.

19. The system of claim 1, further comprising a server repository to receive audit data that has been recorded from the one or more industrial control components.

20. The system of claim 19, further comprising an analysis component that is applied to the audit data to further determine whether an industrial control process at least one of meets, exceeds, and is below existing or emerging regulations, standards, and quality thresholds.

21. The system of claim 1, the audit data further comprising metadata that is associated with one or more database elements that describe supervisory aspects for control and security purposes.

22. The system of claim 1, further comprising a user security component that includes at least one of a login id and associated password before gaining access to an SQL database that stores the audit data.

23. The system of claim 22, the user security component further comprising an authentication procedure to determine rights to access all or selected audit data.

24. A method for verifying an industrial control process, comprising:
monitoring activity data directed to one or more control components;
tagging at least one file that is related to the or more control components;
logging the activity data in at least one of a local and a remote location; and
aggregating the logged activity data in the at least one file.

25. The method of claim 24, further comprising employing the at least one file to automatically generate an audit data report.

26. The method of claim 24, the activity data includes at least one of logging-on, logging off, bit manipulations, logic changes, going on line and off line with a controller or communications module, and events related to activities of an application that interacts with the one or more control components.

27. The method of claim 25, the audit data report is generated in accordance with at least one of an event-driven basis, a periodic basis and a request basis.

28. A audit system for an industrial control process, comprising:
means for logging current access attempts for an industrial control process;
means for at least one of communicating and categorizing the access attempts;
means for storing the access attempts; and
means for generating a report that details the access attempts that have occurred over time.

29. A computer readable medium having stored thereon a data structure, comprising:
a first data field representing real time access data to an industrial control component;
a second data field representing a tag name to store and aggregate the real time access data; and
a third data field to categorize the real time access data.

30. The medium of claim 29, the data structure is at least one of an XML schema and an SQL file.

31. The medium of claim 29, the third data field includes at least one of an application type, a date, a time, an activity, a username, a machine name, a location, a resource, and a message.

32. The system of claim 31, the activity includes at least one of an application has started or stopped, a file has been opened or closed, a rung has been altered, a user has logged on or off, and a bit has changed.

33. An audit system for an industrial control process, comprising:
a client application to store real time network access data directed to at least one industrial control component, the network access data employed to generate an audit report for the at least one industrial control component; and
a security component associated with the client application to facilitate at least one of secure communications and secure storage of the real time network access data.

34. The system of claim 33, the network access data is acquired via at least one of a local interface, a remote interface, and a wireless interface.

35. The system of claim 33, the security component includes one or more security layers, the security layers including at least one of a trust component to provide machine authentication, an encryption component to provide user authentication, authorization, and data encryption, and a policy component to facilitate varying levels of data access.

36. The system of claim 35, further comprising one or more additional security layers to analyze received data, provide segmented security areas within controllers or databases having various security mappings or permissions, and maintain subnet lists specifying valid machine or data access addresses.

37. The system of claim 35, the one or more security layers include at least one of virtual private networks mitigating unauthorized access, encapsulation protocols shielding underlying control protocols, and LAN-locked layers mitigating access from public networks.

38. The system of claim 35, the security layers include at least one of a public key, a certificate, an Internet Key Exchange (IKE) component, an Internet Protocol Security (IPSEC) component, a Kerberos component, one or more security policies, and a Secure Socket Layers (SSL).

39. The system of claim 35, the security layers further comprising at least one of an encryption algorithm, an integrity algorithm, and a Diffie-Hellman exchange.

* * * * *